United States Patent [19]

Nishizawa et al.

[11] 4,061,557
[45] Dec. 6, 1977

[54] ASSEMBLY OF ELECTRODES

[75] Inventors: Kazuo Nishizawa; Ken Higashitsuji; Yuji Mori, all of Kyoto, Japan

[73] Assignees: Marubishi Yuka Kogyo Kabushiki Kaisha; Kazuo Nishizawa, both of Kyoto, Japan

[21] Appl. No.: 578,981

[22] Filed: May 19, 1975

[30] Foreign Application Priority Data

May 24, 1974 Japan .................................. 49-057927
Oct. 19, 1974 Japan .................................. 49-119888

[51] Int. Cl.² .......................... C25B 9/00; C25B 9/02; C25C 7/00; C25C 7/02
[52] U.S. Cl. ..................... 204/277; 204/252; 204/259; 204/265; 204/270; 204/280; 204/289; 204/294
[58] Field of Search ................ 204/149, 150.1 R, 202, 204/222, 270, 277, 294, 292, 291, 290 R, 290 F, 284, 283, 281, 280, 259, 252, 267, 269; 66/1 R

[56] References Cited

U.S. PATENT DOCUMENTS

| 722,583 | 3/1903 | Imhoff | 204/292 X |
| 2,361,378 | 10/1944 | Brennan | 204/292 X |
| 2,643,222 | 6/1953 | Cox | 204/283 X |
| 3,619,391 | 11/1971 | Eisner | 204/149 |
| 3,915,822 | 10/1975 | Veltman | 204/149 X |
| 3,923,629 | 12/1975 | Shaffer | 204/149 X |

Primary Examiner—Arthur C. Prescott
Attorney, Agent, or Firm—Armstrong, Nikaido & Marmelstein

[57] ABSTRACT

An assembly of electrodes suitably for use in electrochemical processes, comprising a plurality of elongated conductive elements as electrodes arranged substantially in parallel in a vertical plane and spaced apart from each other. At least one elongated non-conductive element is interposed between every two adjacent conductive elements. Preferably, both the conductive and non-conductive elements are flexible and the assembly comprises a base fabric of non-conductive material and a plurality of conductive elements incorporated in said base fabric.

3 Claims, 18 Drawing Figures

ASSEMBLY OF ELECTRODES

The invention relates to an assembly of electrodes suitable for use in electrochemical processes, especially in such processes involving a gas-liquid reaction.

In electrolysis, a pair of reactions take place concurrently, one in the vicinity of or on the anode and the other in the vicinity of or on the cathode. In most applications, only one of these reactions, i.e. either anodic oxidation or cathodic reduction, is desired. Since the reaction products formed in the vicinity of or on the opposite electrode are not desired and, if not controlled from contacting the reaction products of the desired reaction, adversely affect the desired reaction, measures have heretofore been taken to prevent the mixing together of the two reaction products, for example, by providing a suitable diaphragm in the cell between the opposing electrodes. In frequent cases where the electrolyte is lacking any material that is electrochemically active against the opposite electrode, as is the case with aqueous electrolyte, electrolysis of water takes place. Because of a higher overvoltage involved in such cases, a higher voltage is normally required for the desired reaction. To overcome such a disadvantage it is known to use a suitable depolarizer, such as oxygen (or air). Such a gaseous depolarizer may conveniently be supplied to the cell by bubbling it through the electrolyte. However, the bubbling of oxygen not only achieves limited effects in view of a considerable increase in the resistance of the electrolyte due to the bubbling and a possible diffusion of the oxygen through the electrolyte onto the cathode surface but also it makes the construction of the cell more complicated.

Various attempts have heretofor been made to eliminate or reduce the above-discussed difficulties involved in the prior art electrochemical cells. Among others, Japanese laid-open patent specification No. sho-48-79177, published on Oct. 24, 1973, discloses a multibipolar cell unit type of cell. In that cell the bipolar cell unit elements are of elongated form such as of rods or bars, and are arranged horizontally in parallel arrays, such as one above the other in a number of substantially vertical planes. Said arrays are separated from each other by means of "O"-ring spacers mounted on alternate elements. Further, arrangements are made for the flow of electrolyte through the cell to be such that only thin films of the electrolyte flow over the surfaces of the bipolar elements.

When the cell disclosed in the above mentioned Japanese laid-open specification is operating the electrolyte contacts the upper surface of the top element and flows downwards over its surface on either side, and the two flow paths unite beneath the element to cause a bridge of electrolyte between that element and the succeeding element, whereafter a similar flow of electrolyte occurs over the next element, and so on. Thus, products formed on or in the vicinity of the upper surface of each element are allowed to contact a gas being passed through the cell, while the electrolyte is flowing in the form of thin films on either side of the element. Consequently, it will be understood that when said products of electrolysis reach the lower surface of said element, they have effectively reacted with the reactant in the gas, or any gaseous products of the reaction, which are desired to be removed from the cell, have been disengaged. However, products formed on or in the vicinity of the lower surface of each element directly go to the upper surface of the succeeding element and undesirably mix with products being formed there. Accordingly, the prior art problems are as yet not completely solved by the cell constructions proposed in the Japanese laid-open specification.

It is an object of the present invention to provide an assembly of electrodes suitable for use in electrochemical processes, especially those involving a gas-liquid reaction and/or removal of a certain gaseous product from the electrolyte, which eliminates or greatly reduces the difficulties as discussed above.

Another object of the present invention is the provision of a novel fabric for use in electrochemical processes, having both cathode and anode incorporated therein.

Other objects and advantages of the invention will be apparent from the following description and the accompanying drawings, in which.

Figure 7:
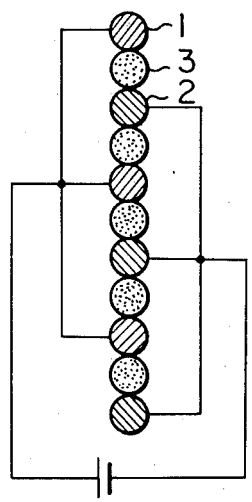
Figure 8:
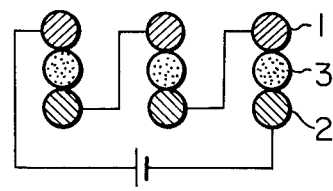
Figure 9:
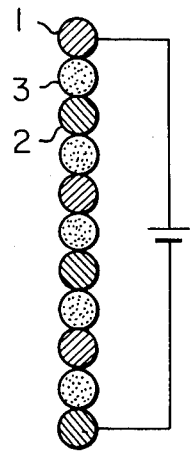
Figure 10:
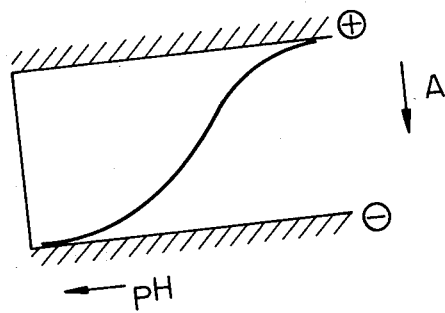
Figure 11:
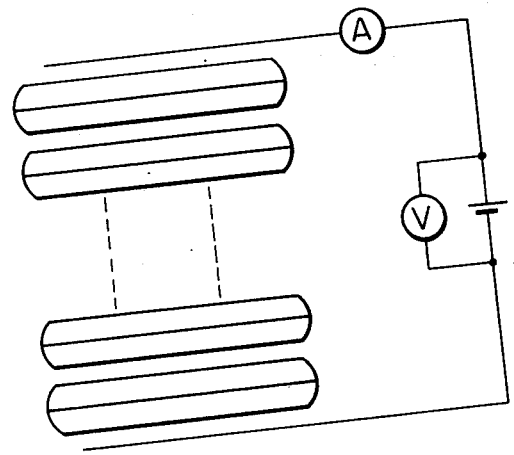
Figure 12:
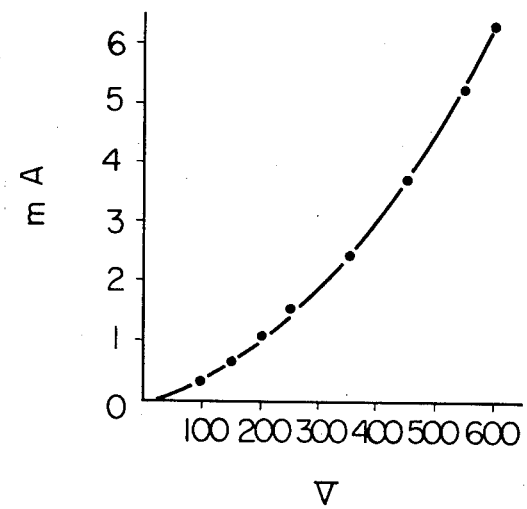
Figure 13:
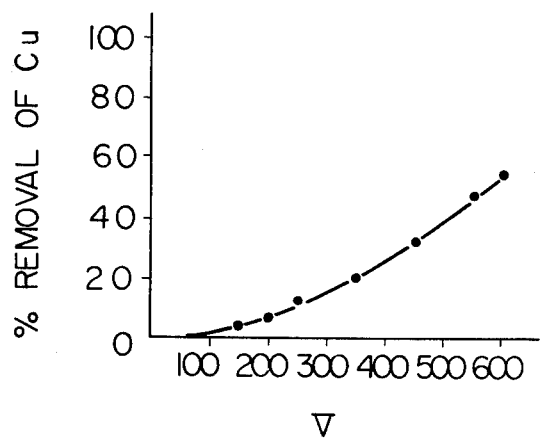
Figure 16:
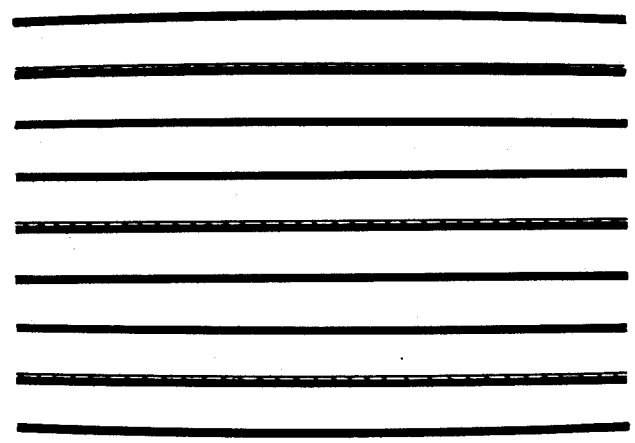
Figure 14:
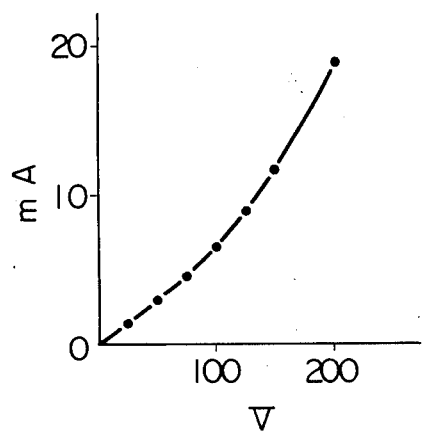
Figure 15:
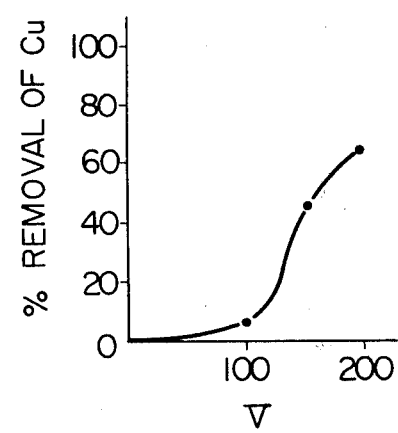
Figure 17:
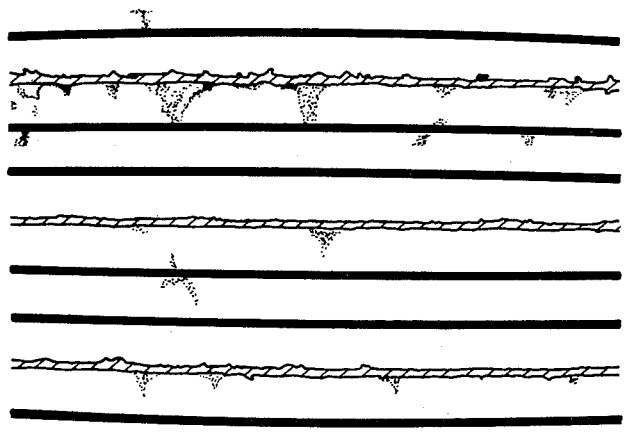
Figure 18:
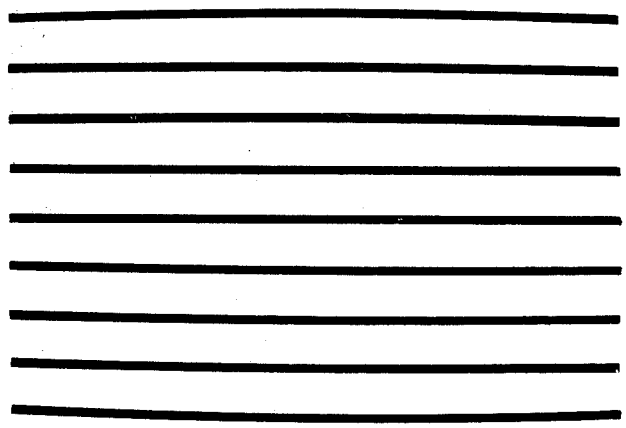

FIGS. 7, 8 and 9 respectively illustrate parallel, series and bipolar current paths of the cell units;

FIG. 10 illustrates a steady gradient of the concentrations of a particular ion formed between the adjacent elements;

FIG. 11 shows the paths of current as used in Examples 13 through 18;

FIG. 12 shows a steady relationship between the current and the voltage for a certain system;

FIG. 13 shows a steady relationship between the attainable percentage of copper removal and the voltage, for the same system as in FIG. 12;

FIG. 14 shows a similar relationship to that of FIG. 12, for another certain system;

FIG. 15 shows a similar relationship to that of FIG. 13, for the same system as in FIG. 14;

FIG. 16 shows the appearance of the fablic, used in Example 13, after use;

FIG. 17 shows the appearance of the fabric used in Example 14 with insoluble materials deposited thereon, and;

FIG. 18 shows the appearance of the fabric shown in FIG. 17, after being washed by water spraying.

In accordance with one aspect of the invention there is provided an assembly of electrodes suitable for use in electrochemical processes, which comprises a plurality of linear elongated conductive elements extending in different planes substantially parallel to each other and, a plurality of linear elongated non-conductive elements extending in different planes substantially parallel to each other and to the first-mentioned planes, said conductive and non-conductive elements being arrnaged in a plane substantially perpendicular to the first- and second-mentioned planes and also in such a manner that at least one of said non-conductive elements is located between every two adjacent conductive element.

The invention further provides an electrochemical cell wherein at least one assembly of electrodes is vertically and operably mounted, said assembly comprising a plurality of elongated conductive members extending in different planes substantially parallel to each other and a plurality of elongated non-conductive elements extending in different planes substantially parallel to each other and to the first-mentioned planes, said conductive and non-conductive elements being arranged in a plane substantially perpendicular to the first- and second-mentioned planes and also in such a manner that at least one of said non-conductive elements is located between every two adjacent conductive elements, and wherein there are provided means for supplying an electrolyte and uniformly distributing the same over said assembly of electrodes so as to allow the electrolyte to uniformly flow downwards in the form of thin films over the surfaces of said assembly, and means for feeding a gas to the cell at the bottom thereof and allowing the same to flow upwards while contacting the flowing films of the electrolyte.

The conductive elements usable in the invention may be of suitable conductive materials, such as platinum, gold, lead peroxide, graphite, titanium oxides, palladium, iron, steel, stainless steel, aluminum, lead nickel, magnetite and the like, alone or in combination, the overall configuration being of straight or curved elongated form, such as rod, bar, wire, tube, pipe, tape, strip, cord, strand, thread, yarn and the like. The conductive elements may be either rigid, as is the case with metal or graphite rods and tubes, or flexible as with thin metal wires and graphitized carbon strands. It is not necessary that the elements be solid, and, thus, they may be hollowed, porous, fibrous or in the form of wire net or gauze. In cross-section, the elements need not be circular, nor need they be homogeneous. For example, they may be products which have been subjected to surface treatments, such as plating, coating, surface-oxidation and -per-oxidation and the like. Furthermore, a non-conductive monofilament, yarn, rod or tube having a plated or vacuum deposited layer of conductive material or having a conductive wire or strand wound thereon may also be used as a conductive element.

The non-conductive elements usable in the invention may be of suitable non-conductive materials, such as glass, ceramic, asbestos, natural and synthetic non-conductive polymers and the like, alone or in combination, the overall configuration being of straight or curved elongated form, such as rod, bar, tube, pipe, tape, strip, cord, strand, yarn and the like. The non-conductive elements may be either rigid, as is the case with glass rods and tubes, or flexible as with cords, strands or yarns of non-conductive textile or glass fibers. As is the case with conductive elements, the non-conductive elements need not be solid, and may be hollowed, porous, fibrous, or in the form of net or gause. In cross-section, the elements need not be circular, nor need they be homogeneous. Thus, they may have some irregularities on the surfaces, such as lands and depressions for guiding and uniformly distributing the electrolyte over their surfaces, or they may have non-conductive strands or yarns wounded thereon.

The conductive and non-conductive elements may be secured in position by any suitable means. When the assembly of electrodes of the invention is to be mounted in an electrochemical cell with each element horizontal, and where the conductive and non-conductive elements are rigid, each element may be securely supported by fixing to the side pieces of the cell. Alternatively, the elements may be tied together by means of suitable non-conductive flexible strands or yarns to construct the assembly, which may be hung in position in the cell. In a preferred embodiment, both conductive and non-conductive elements are flexible, and are incorporated in a fabric construction, as hereinafter described in more detail. The assembly of electrodes of the invention may also be mounted in the cell with each element vertical.

Figure 1:
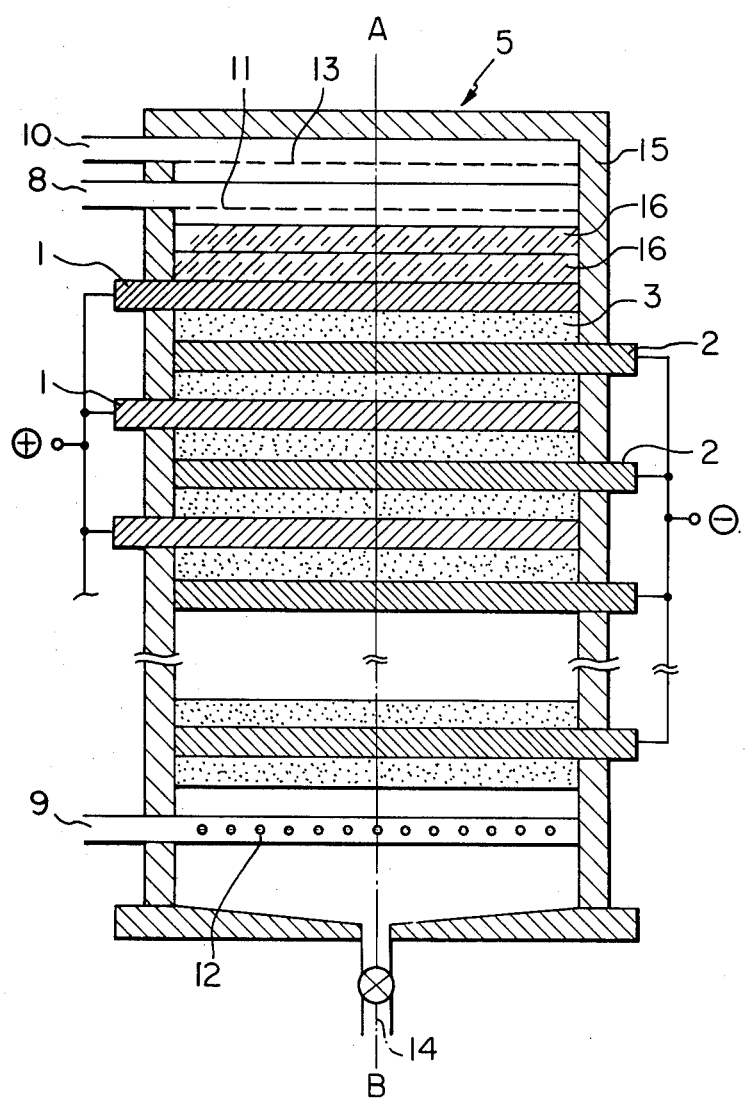
FIG. 1 is a schematic vertical cross-sectional view of one form of an electrochemical cell in which an assembly of electrodes, in accordance with the invention is mounted.
Figure 2:
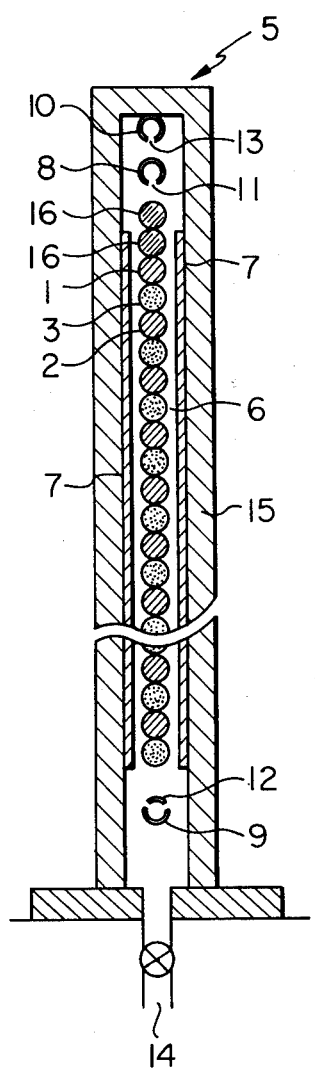
FIG. 2 is a cross-section of the cell of FIG. 1, taken along the line A-B.

Referring to FIGS. 1 and 2, when the illustrated cell 5 is operating, an electrolyte is supplied through a horizontal pipe 8 to the cell, distributed by being passed through a row or rows of apertures 11 provided on the lower surface of the pipe 8 in the portion located in the cell, over the upper surface of glass rods 16 for ensuring uniform film flow, and then flows downwards on both sides of the assembly of electrodes, which consist of a plurality of horizontal, rod-like, rigid anodes (or cathodes) 1 and horizontal, rod-like, rigid cathodes (or anodes) 2 alternately arranged in a vertical plane with a horizontal, rod-like, rigid non-conductive element 3 under each electrode (1 or 2). The electrodes and non-conductive rods are secure to side pieces of a housing 15. In the illustrated cell the electrodes are connected in parallel. While flowing downwards in the form of thin films on the surfaces of the assembly, the electrolyte is electrolyzed between each pair of cathode and anode. At the same time, a gas suitable for the desired reaction is fed through a pipe 9 to the cell at the bottom, distributed by passing through rows of apertures 12 provided on the upper surface of the pipe 9 in the portion located in the cell, flows upwards through the spaces 6 in the cell while contacting the thin flowing films of the electrolyte, and is discharged through apertures 13 and a discharge pipe 10. The electrolyte so electrolyzed is withdran from the cell through a discharge port 14 provided at the bottom of the cell.

While the illustrated cell 5 is surrounded by a fluid-tight housing 15, side plates of the housing 15 may be removed, if desired, so as to carry out the electrolysis in the atmospheric air. If desired, depending upon the nature of the intended reaction, means 7 for irradiating the flowing films of electrolyte may be provided, conveniently on the inside walls of the side plates of the housing 15. Further, if hollow elements are included it is possible to pass a suitable heating or cooling medium through such elements thereby to effect a rapid and effective temperature controll of the system.

The particular gas to be passed through the cell may be selected depending upon the nature of the intended reaction. Thus, oxidizing gasses, such as oxygen, air, chlorine, ozone and the like may be used for oxidation, while reducing gases, such as hydrogen, may be used for reduction. In some cases, where an inert atmosphere is desired for the intended reaction, an inert gas, such as nitrogen, may be used, and in other cases, where gaseous products of electrolysis are to be isolated and recovered, use of steam or carbon dioxide is frequently advantageous. On the other hand, when it is intended to remove a particular component from a given gaseous mixture, a suitable electrolyte must be selected depending upon the nature of the given mixture.

Figure 3:
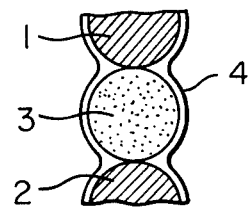
FIG. 3 is an enlarged partial view of FIG. 2.

When the cell illustrated in FIGS. 1 and 2 is operating, products of electrolysis formed on the lower surface of each electrode 1 as well as those formed on the upper surface of each electrode 2 flow downwards in the form of thin films 4 before the products reach the opposite electrode (see FIG. 3).

In the preferred embodiments, the assembly of electrodes in accordance with the invention comprises a woven or knitted fabric of non-conductive material and a plurality of elongated conductive elements are incorporated therein substantially in parallel and spaced apart from each other. The conductive elements are preferably flexible and may be incorporated in the base fabric of non-conductive material during or after the manufacture of the fabric.

Figure 4:
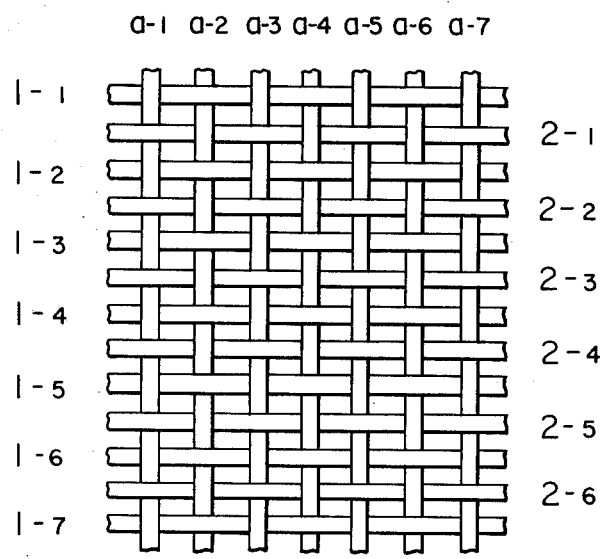
FIG. 4 is a schematic plan view of a fabric for electrolysis in accordance with the invention.

FIG. 4 schematically illustrates a fabric for electrolysis in accordance with the invention. The fabric is a plain fabric in which the warp consists of non-conductive yarns $a$-1 to $a$-7 such as polyester, cotton, or glass yarns while the weft consists of similar non-conductive yarns 1-1 to 1-7 and elongated conductive elements 2-1 to 2-6, such as strands of graphatized carbon filaments or platinum wires, the adjacent conductive elements being separated by at least one non-conductive yarn. While the illustrated fabric for electrolysis is a plain fabric, woven fabrics of other weave constructions and knitted fabrics may also be utilized. Furthermore, the conductive elements may be incorporated into the preformed base fabric, for example, by insertion, sewing, adhesion, or coating. The fabric for electrolysis in accordance with the invention has the following advantages.

Figure 5:
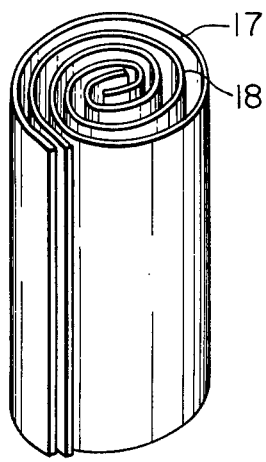
FIG. 5 illustrates a wound fabric for electrolysis in accordance with the invention.

1. Formation of a uniform film flow of electrolyte is facilitated.
2. A larger surface area per unit weight of the electrode material may be achieved.
3. Because of its flexibility, the electrode assembly may be used in a wound form, as shown in FIG. 5, in which the numeral 17 designates the fabric for electrolysis according to the invention while the numeral 18 designates an insulating film such as a polyester film.
4. Since the base fabric bears loads, the assembly of electrodes has mechanical strength sufficient to be used in electrochemical processes.
5. Any desired length and width may readily be achieved.
6. Manufacturing, handling and using of the electrode assembly are simple and easy.

Figure 6:
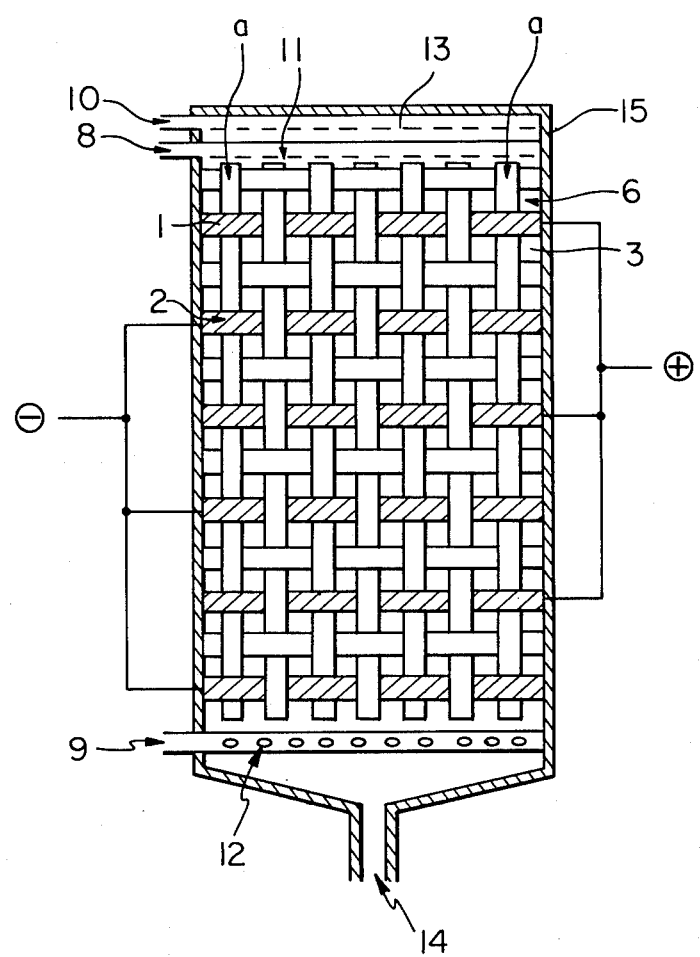
FIG. 6 is a schematic cross-sectional view of an electrochemical cell in which a fabric in accordance with the invention is mounted.

FIG. 6 illustrates an electrochemical cell in which a fabric for electrolysis according to the invention in mounted. In FIG. 6, the same reference numerals are used as in FIG. 1 to designate the same parts of the cells. The letter $a$ designats a warp yarn of the fabric. Thus, according to a further aspect of the invention there is provided an electrochemical cell wherein at least one assembly of electrodes in vertically and operably mounted, said assembly comprising a woven or knitted fabric of non-conductive material wherein a plurality of elongated conductive elements are incorporated so as to be substantially parallel and spaced apart from each other and in which cell there are provided means for supplying an electrolyte and uniformly distributing the same over said fabric so as to allow the electrolyte to uniformly flow downwards in the form of thin films over the surfaces of said fabric and means for feeding a gas to the cell at the bottom thereof and allowing the same to flow upwards while contacting the flowing films of the electrolyte.

In the cells of the invention the electrodes may be connected in any suitable manner. They may be connected so as to form parallel, series or bipolar paths, as illustrated in FIGS. 7, 8 and 9, respectively. If desired, two or more adjacent conductive elements may be short-circuited so as to form one electrode.

The assemblies of electrodes, fabrics for electrolysis and electrochemical cells described herein are applicable to any reactions which have heretofore been carried out in conventional electrochemical processes. They are particularly suitable for use in electrochemical processes involving a gas-liquid reaction or formation of gaseous products to be removed. Among others, the invention may be applied to the following reactions.

1. Removal of metal ions by oxidation or reduction, for example, removal of metals (such as Cu, Cd, Cr, Co, Hg, Zn, Mn, Fe and the like) from waste liquids containing the same.
2. Treatment of waste liquids containing organic contaminants, such as waste liquids from dye or dyeing industries or from food industries.
3. Deodorization, for example, removal of hydrogen sulfide, mercaptans, sulfur dioxide and the like.
4. Desulfurization and denitrogenation of waste or exhaust gases.
5. Destruction of colloidal dispersions, such as destruction of oil-in-water or water-in-oil emulsions and, floculation and removal of colloidally dispersed particles.
6. Manufacturing processes based on direct or indirect anodic oxidation or cathodic reduction, including, for example, formation of hypochlorites, chlorates, per-chlorates, sodium hydroxide and chlorine by the electrolysis of an aqueous solution of sodium chloride; production of permanganates from manganates; production of gluconates from gluconic acid; production of succinates from maleic acid; production of hydroxylamine from nitric acid and the like.

It has been found that the fabric for electrolysis and the cell, in which said fabric is mounted, are especially useful in a continuous process for removing solutes from an aqueous solution containing the same dissolved therein, said solutes being capable of forming insoluble materials depending upon the pH of the solution. Thus, in accordance with a special aspect of the invention, there is provided a continuous process for the removal of solutes from an aqueous solution containing the same dissolved therein, said solutes being capable of forming insoluble materials depending upon the pH of the solution, which process comprises the steps of causing said aqueous solution to flow downwards in the form of thin films over a vertical fabric of non-conductive material in which a plurality of elongated conductive elements are incorporated so as to be parallel and spaced apart from each other, and applying a potential to said conductive elements so as to produce a suitable steady pH distribution in the thin films of the solution flowing downwards over the fabric, whereby said solutes are insolubilized and deposited on predetermined zones of said fabric irrespectively of any anodic and cathodic reactions.

When an electrolyte is allowed to flow from one electrode to the other electrode and a suitable potential is applied to the electrodes, a steady distribution or gradient of pH is formed in the flowing electrolyte between the electrodes, as illustrated in FIG. 10, in which the arrow A designates the direction of flow of the electrolyte. The profile of pH depends on various factors, including the composition and concentration of the electrolyte, the applied voltage, the current density, the temperature, the direction and rate of flow of the electrolyte, the distance between the electrodes and the nature and shape of the electrodes. By controlling these factors, a suitable gradient or distribution of pH may be produced in the flowing electrolyte between the electrodes so that the solutes in the electrolyte to be removed may be insolubilized in a zone where the pH is suitable to cause the solute to precipitate. We propose to use the fabric for electrolysis of the invention in such a process. The electrodes are preferably connected to provide a multi-bipolar system. The above-mentioned precipitation takes place over predetermined areas of the fabric, in most case on and in the vicinity of anodes or cathodes, and independently of the anodic and cathodic reactions involved. The deposited insoluble materials are different from the products of electrolysis and can easily be disengaged from the fabric, e.g. by mere water spraging. The fabric may be re-used. Besides metal ions, certain organic acids, amines, amino acids, proteins and other colloidal particles may be advantageously removed by the proposed process from an aqueous solution or dispersion containing the same. As is well-known, metal ions, for example, copper ion, may be removed from an aqueous solution containing the same by alkaline treatment. Such a treatment required, however, use of amounts of alkali and neutralization of the treated solution prior to the disposal thereof. Whereas the process proposed herein does require neither use of such a chemical nor any after-treatments. It has also been found that the proposed process is especially effective when the solution to be treated is relatively dilute and when it is operated with a relatively high current density. Accordingly, the proposed process is particularly useful in removing or reducing a trace of metal ions from waste liquids containing the same or in recovering the last crops of the products from aqueous solution containing the same at the last step of the manufacture thereof.

The invention will be further described by the following illustrative Examples.

EXAMPLE 1

The apparatus used was a type as illustrated in FIG. 1, in which the electrode assembly comprised one hundred horizontal graphite rods and ninty nine horizontal glass rods alternately arranged in a vertical plane. Each rod had a diameter of 10 mm and an effective length of 270 mm. About a $10^{-2}$ molar aqueous solution of sodium chloride containing 100 ppm of copper as copper sulfate was supplied to the apparatus from the top thereof at a rate of 60 ml/min and allowed to uniformly flow down through the apparatus while forming thin films on the rods. At the same time a DC voltage of 40V was applied to the graphite electrodes connected in parallel and the flowing films of electrolyte were contacted with a stream of hydrogen, which was fed to the apparatus from the bottom at a rate of 600 ml/min. The atomic absorption analysis for copper of the liquid leaving the apparatus showed that it contained 1.5 ppm of copper, revealing that the percentage of copper removal was 98.5%. During the operation the current varied within the range between 250 and 450 mA.

EXAMPLE 2

The procedure as described in Example 1 was repeated except that the graphite rods for cathodes were replaced by stainless steel rods and the glass rods were replaced by polyvinyl chloride pipes wrapped with cottom cloth. The liquid leaving the apparatus contained 1.4 ppm of copper. The percentage of copper removal was 98.6%.

EXAMPLE 3

An apparatus as used in Example 1 was used except that a DC voltage of 4000V was applied between the top and bottom electrodes with the remaining electrodes allowed to serve as bipolar electrodes. About a $10^{-2}$ molar aqueous solution of sodium chloride containing 10 ppm of $CN^-$ as sodium cyanide was caused to uniformly flow down through the apparatus at a rate of 60 ml/min. while forming a flowing film on the rods, which film was contacted with air fed to the apparatus from the bottom thereof at a rate of 1,000 ml/min. The liquid leaving the apparatus was tested for $CN^-$ by a method in accordance with JIS-K 0102-29. It contained 0.5 ppm of $CN^-$.

The above procedure was repeated except that the DC source was replaced with a 20 $H_Z$ alternating and pulse source with other conditions remaining substantially the same. A similar result was obtained.

EXAMPLE 4

About a $10^{-2}$ molar aqueous solution of sodium sulfate was supplied to an apparatus as used in Example 1 from the top thereof at a rate of 60 ml/min., allowed to uniformly flow down through the apparatus while forming thin films on the rods, and electrolyzed by applying a sufficient DC voltage to the electrodes to maintain the current density of about $1mA/cm^2$. At the same time, a mixture of sulfur dioxide and oxygen in a ratio of 1:1 by volume was fed to the apparatus from the bottom thereof at a rate of 600 ml/min. or 60 ml/min. and allowed to contact the flowing films of liquid being electrolyzed. The sulfur dioxide and oxygen were absorbed by the electrolyte films and the former was electrolytically oxidized whereby the liquid leaving the apparatus contained the sulfuric acid so formed and exhibited a strong acidity. The sulfuric acid content of the liquid was determined by titration with an aqueous solution of poatassium hydroxide. The measurement and calculation revealed that the percentage of removal of sulfur dioxide was 38% with the flow rate of 600 ml/min. and 75% with the flow rate of 60 ml/min. During the operation of this Example the voltage varied within the range between 32 and 1 volts.

EXAMPLE 5

Using an apparatus as used in Example 1, a four molar aqueous solution of sodium chloride was electrolyzed in a film flow state in an air stream at a temperature of 35° to 40° C. A DC voltage of 6V was applied to the electrodes. 250 ml of the electrolyte was circulated through the apparatus for 30 minutes at a rate of 60 ml/min. At the end of the period, the liquid leaving the apparatus was analyzed by a method in accordance with JIS K-8208, revealing that it contained 38% by weight sodium chloride. During the operation the current varied within the range between 2 and 4A.

EXAMPLE 6

Using an apparatus as used in Example 1 except that the housing 15 was removed so as to expose the flowing film of electrolyte to the atmospheric air, about a $10^{-2}$ molar aqueous solution of sodium chloride containing 100 ppm of methylene blue was allowed to flow down through the apparatus in a film flow state at a rate of 60 ml/min, while a DC voltage of 50V was applied to the electrodes. Oxygen in the air was absorbed by the flowing film of electrolyte and acted as a depolarizer. Colorimetric analysis of the electrolytically oxidised aqueous solution of methylene blue by means of a Hitachi spectrophotometer Model 139 revealed that the percentage of decoloration was 73%. During the operation, the current varied within the range between 350 and 500 mA.

EXAMPLE 7

The procedure as described in Example 6 was repeated except that the flowing film of electrolyte was irradiated by means of a mercury lamp. The enhanced percentage of decoloration of 93% was attained.

The procedure as described in Example 7 was repeated except that the flowing film of electrolyte was irradiated with radiation from cobalt 60 and the rate of flow of the electrolyte was increased to 100 ml/min. In spite of the increased rate of flow, the enhanced percentage of decoloration of 92% was obtained.

EXAMPLE 8

Using a poly (ethylene terephthalate) filamentary yarn having a thickness of about 200 denier as warp and, the same kind of polyester yarn and a platinum wire having a diameter of 0.01 cm as weft, a plain woven fabric for electrolysis having a longitudinal length of 5m and a transverse width of 1m was prepared, in which 5000 platinum wires were incorporated with a spacing of about 1 mm between the centers of each adjacent two platinum wires. The weight of the platinum used was about 930 g, which was slightly in excess of the theoretical weight required for such a construction. The total surface of the platinum electrode was calculated as being approximately 17,300 cm$^2$. The fabric so prepared was flexible and had sufficient strength to be used as an assembly of electrodes in electrochemical processes.

EXAMPLE 9

Using a cotton yarn of 30 count as warp and, such the same kind of yarn and a platinum wire as weft, a plain woven fabric was prepared, in which every adjacent two platinum wires were separated by two cotton yarns so that the distance between the adjacent platinum wires was about 1.8 mm. The fabric so prepared was flexible and had sufficient strength to be used as an assembly of electrodes in electrochemical processes.

EXAMPLE 10

Similar plain woven fabrics were prepared, one wherein the warp consisted of cotton yarns of 30 count while the weft consisting of the same kind of yarns and filamentary carbon threads of 1800 denier, each of said carbon theads in the weft being separated from the adjacent carbon threads by a distance of about 3 mm, and the other wherein the warp consisted of cotton yarns of 30 count while the weft consisted of the same kind of yarns and filamentary carbon threads of 1800 denier as anodes, and strands of steel fibers as cathodes, said anodes and cathodes being arranged alternately with a spacing of about 3 mm between every two adjacent electrodes. These fabrics were flexible and had strength sufficient to be used as an assembly of electrodes in electrochemical processes.

EXAMPLE 11

From a fabric, described in the preceding Example, having the carbon threads and the strands of steel fibers as anodes and cathodes, respectively, a rectangular fabric for electrolysis having a dimension of 50 cm × 1 m was cut, with the electrodes extending substantially parallel to the shorter sides of the cut fabric.

The fabric for electrolysis was mounted in an apparatus as illustrated in FIG. 6, with the electrodes horizontal and connected in parallel. A 10$^{-2}$ molar aqueous solution of sodium chloride containing 100 ppm of methylene blue was supplied to the apparatus from the top thereof at a rate of 30 ml/min. and allowed to uniformly flow down through the cell in the form of thin films. At the same time, air was supplied to the apparatus at a rate of 1,000 ml/min. and a DC voltage of 25V was applied between anodes and cathodes. Calorimetric analysis of the electrolytically oxidized solution by means of a Hitachi spectrophotometer, Model 139, revealed that the percentage of decoloration was 82%. During the operation, the current varied within the range between 2 and 4A.

EXAMPLE 12

From a fabric, described in Example 10, having the carbon threads as electrodes, a rectangular fabric for electrolysis having a dimension of 50 cm × 1 m was cut, with the carbon threads extending substantially paralles to the shorter sides of the cut fabric.

The fabric for electrolysis was mounted in an apparatus as illustrated in FIG. 6, with the electrodes horizontal and connected in parallel. A 10$^{-2}$ molar aqueous solution of sodium sulfate was supplied to the apparatus from the top thereof at a rate of 60 ml/min., allowed to uniformly flow down through the apparatus in the form of thin films, and electrolyzed by applying a DC voltage to the electrodes sufficient to maintain a current of 3A. At the same time, 2 l of a mixture of sulfur dioxide and oxygen in a ratio of 1:1 by volume was fed to the apparatus from the bottom thereof at a rate of 600 ml/min. and allowed to contact the flowing films of liquid being electrolyzed. The mixed gas which had passed through the apparatus was recycled and the operation was continued for 10 minutes. The sulfur dioxide and oxygen were absorbed by the electrolyte films and the former was electrically oxidized, whereby the liquid leaving the apparatus contained the sulfuric acid so formed and exhibited a strong acidity. The sulfuric acid content of the liquid was determined by titration with an aqueous solution of potassium hydroxide. The measurement and calculation revealed that the percentage of removal of sulfur dioxide was 73%. During the operation of this Example, the voltage varied within the range between 1 and 4V.

EXAMPLE 13

Using a poly (ethylene terephthalate) filamentary thread of about 200 denier as warp and, such a polyester yarn and a carbon thread of about 1800 denier as weft, a plain woven fabric having a width of 38 cm was prepared, in which the carbon threads were incorporated with 10 mm intervals. As illustrated in FIG. 11, every carbon thread in the fabric, except for the top and bottom ones, were electrically short-circuited to form a bipolar element 39. Such bipolar elements were formed between the top and bottom carbon thread to be used as current-carrying electrodes. The fabric so prepared was mounted in a cell of a type as illustrated in FIG. 6 with the carbon threads horizontal. The side plates of the cell were removed so as to expose the flowing films of electrolyte to the atmospheric air.

A 10$^{-3}$ molar aqueous solution of sodium chloride containing 100 ppm of copper as copper sulfate was supplied to the cell at the top at a rate of 60 ml/min. and allowed to uniformly flow down in the form of thin films along the fabric. The top and bottom carbon threads were connected to a DC source, with the top carbon threads connected to the positive pole of the source, and varying DC voltages were applied therebetween. The electrolyte leaving the cell was tested for the residual copper content by atomic absorption analysis. The current plotted against the voltage and the attained percentage of copper removal plotted against the voltage are shown in FIGS. 12 and 13, respectively.

Using a DC voltage of 250V, the electrolysis as described above was continued for a period of 30 minutes. The current was 1.5 mA. At the end of the period it was observed that the lowest cathode and the uppermost carbon thread of each bipolar element were plated with reduced copper on the upper side thereof. FIG. 16 shows such a fabric for electrolysis after use, in which solid lines represent carbon threads and hatched areas represent reduced copper which has been deposited on the lowert cathode and bipolar elements. As seen from FIG. 16, deposits obtainable under the conditions of this Example are primarily comprised of reduced copper.

EXAMPLE 14

The experiments as described in the preceding Example were repeated except that the electrolyte was replaced by a $10^{-1}$ molar aqueous solution of sodium chloride containing 100 ppm of copper as copper sulfate. The relationship between the current and voltage and that between the attained percentage of copper removal and the voltage are shown in FIGS. 14 and 15, respectively.

Using a DC voltage of 200V, the electrolysis as described above was continued for a period of 30 minutes. The current was 18.5 mA. The results were essentially distinct from those of the preceding Example. At the end of the period, the fabric had an appearance as illustrated in FIG. 17. It was observed that flocs of various colors, including redish brown, dark brown, bluish green, greyish green and other, had been deposited on and in the vicinity of the lowest cathode and the uppermost carbon thread of each bipolar element. When the electric source had been cut off, some of the flocs were separated from the fabric and began to fall down. When such a fabric was washed with water by spraying, almost all the deposits could readily be removed from the fabric. FIG. 18 illustrates the fabric after washing. The washed fabric which had an appearance similar to that of the fresh one was substantially free of reduced copper electrolytically deposited thereon and could be re-used. The flocs washed off with water from the fabric could readily be collected by filtering them off on a JIS G-3 glass filter.

EXAMPLE 15

Using a DC voltage of 550 V, the procedure as described in Example 13 was repeated. The current was 5.3 mA. Results similar to those of Example 14 were obtained.

EXAMPLE 16

The procedure as described in Example 13 was repeated except that a $10^{-1}$ molar aqueous solution of copper sulfate containing 20 ppm of copper was electrolyzed with a voltage of 300V and a current of 26 mA. The electrolyte leaving the cell contained 8 ppm of copper. This means a percentage of copper removal of 60%. The removed insoluble deposits were analogous to those of Example 14.

EXAMPLE 17

The general procedure as described in Example 13 was repeated except that a $10^{-1}$ molar aqueous solution of sodium chloride containing 20 ppm of iron as ferric chloride was treated at a rate of 30 ml/min. with a voltage of 300 V and a current of 25 mA. Atomic absorption analysis for iron of the liquid leaving the cell indicated that the percentage of iron removal was 90%. The deposits on the fabric were water-insoluble materials, which could readily be removed from the fabric by water spraying.

EXAMPLE 18

The general procedure as described in Example 13 was repeated except that a $10^{-1}$ molar aqueous solution of sodium chloride containing 20 ppm of aluminum as aluminum sulfate was treated at a rate of 30 ml/min. with a voltage of 400 V and a current of 47 mA. Atomic absorption analysis for aluminum of the liquid leaving the cell indicated that the percentage of aluminum removal was 88%. The deposits on the fabric were water insoluble materials which could easily be removed from the fabric.

EXAMPLE 19

The general the procedure as described in Example 13 was repeated except that the top and bottom carbon threads in the fabric were connected to the negative and positive poles of the DC source, respectively, and a $10^{-2}$ molar aqueous solution of sodium chloride containing 1% by weight of sodium laurate was treated at a rate of 45 ml/min. with a current of 10 mA. Water-insoluble materials had been deposited on and in the vicinity of the lowest anode and the uppermost carbon thread of each bipolar element. Measurement of the residual laurate in the treated liquid, in accordance with the standard oil and fat testing method prescribed by the Japan Oil Chemists Society, indicated that the percentage of laurate removal was 65%.

What is claimed is:

1. A fabric suitable for use as an electrode in electrochemical processes which comprises a woven or knitted fabric of a non-conductive material wherein a plurality of flexible elongated and anodic and cathodic conductive elements are incorporated so as to be substantially parallel, the adjacent conductive elements being separated from one another by said fabric forming non-conductive material, a first lead means for connecting at least one of said anodic conductive elements with the positive pole of a DC source and a second lead means for connecting at least one of the cathodic conductive elements with the negative pole of said DC source.

2. A fabric in accordance with 1, wherein said fabric is composed of non-conductive material selected from the group consisting of polyesters, cotton and glass, and each of said conductive elements is selected from the group consisting of a platinum wire and a strand of graphitized carbon filaments.

3. An electrochemical cell wherein at least one assembly of electrodes is vertically and operably mounted, said assembly comprising a woven or knitted fabric of non-conductive material wherein a plurality of flexible anodic and cathodic elongated conductive elements are incorporated so as to be substantially parallel and spaced apart from each other by said fabric forming non-conductive material, a first lead means for connecting at least one of said anodic conductive elements with the positive pole of a DC source and a second lead means for connecting at least one of the cathodic conductive elements with the negative pole of said DC source, and in which cell there are provded means for supplying an electrolyte and uniformly distributing the same over said fabric so as to allow the electrolyte to uniformly flow downwards in the forms of thin films over the surfaces of said fabric and means for feeding a gas to the cell at the bottom thereof and allowing the same to flow upwards while contacting the flowing films of the electrolyte.

* * * * *